United States Patent
Li

(10) Patent No.: US 9,306,471 B2
(45) Date of Patent: Apr. 5, 2016

(54) MICRO INVERTER OF SOLAR POWER SYSTEM AND METHOD OF OPERATING THE SAME

(71) Applicant: Delta Electronics, Inc., Taoyuan County (TW)

(72) Inventor: Sheng-Hua Li, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 299 days.

(21) Appl. No.: 14/165,992

(22) Filed: Jan. 28, 2014

(65) Prior Publication Data

US 2015/0085542 A1 Mar. 26, 2015

(30) Foreign Application Priority Data

Sep. 26, 2013 (TW) .............................. 102134715 A

(51) Int. Cl.
| | | |
|---|---|---|
| H02M 7/44 | (2006.01) | |
| H02M 1/32 | (2007.01) | |
| H02J 3/38 | (2006.01) | |
| H02M 1/00 | (2007.01) | |

(52) U.S. Cl.
CPC .................. *H02M 7/44* (2013.01); *H02J 3/383* (2013.01); *H02M 1/32* (2013.01); *H02J 3/385* (2013.01); *H02M 2001/007* (2013.01)

(58) Field of Classification Search
CPC ... H02M 1/32; H02M 7/44; H02M 2001/007; G05F 1/66; G05F 1/67
See application file for complete search history.

(56) References Cited

U.S. PATENT DOCUMENTS

| | | | | |
|---|---|---|---|---|
| 6,081,104 A | * | 6/2000 | Kern | H02J 9/065 320/101 |
| 6,590,793 B1 | * | 7/2003 | Nagao | H02J 7/35 323/222 |
| 8,472,220 B2 | * | 6/2013 | Garrity | H02M 7/46 307/45 |
| 9,143,082 B2 | * | 9/2015 | Itako | G05F 1/67 |
| 2009/0284998 A1 | * | 11/2009 | Zhang | G05F 1/67 363/55 |
| 2009/0316447 A1 | * | 12/2009 | Kim | G05F 1/67 363/37 |
| 2010/0157632 A1 | * | 6/2010 | Batten | H02M 7/4807 363/74 |
| 2011/0134668 A1 | * | 6/2011 | Cho | G05F 1/67 363/78 |
| 2011/0309684 A1 | * | 12/2011 | Song | H02J 3/383 307/87 |
| 2012/0062044 A1 | * | 3/2012 | Wagoner | H02J 3/38 307/151 |
| 2012/0205974 A1 | * | 8/2012 | McCaslin | H02J 3/385 307/18 |
| 2012/0235486 A1 | * | 9/2012 | Li | H02J 3/385 307/64 |

(Continued)

*Primary Examiner* — Timothy J Dole
*Assistant Examiner* — Yusef Ahmed
(74) *Attorney, Agent, or Firm* — Hauptman Ham, LLP

(57) ABSTRACT

A method of operating a micro inverter of a solar power system includes following steps: First, an output power value of a solar photovoltaic module is acquired. Afterward, it is to judge whether the micro inverter executes a power boosting mode. If the power boosting mode is executed, a maximum output power of the micro inverter is boosted from a rated output power value to a maximum output power value. Finally, it is to judge whether the output power value of the solar photovoltaic module is greater than the maximum output power value. If YES, the maximum output power value is outputted from the micro inverter.

14 Claims, 6 Drawing Sheets

(56) References Cited

U.S. PATENT DOCUMENTS

| | | | |
|---|---|---|---|
| 2012/0319640 A1* | 12/2012 | Park | G05F 1/67 320/101 |
| 2013/0027993 A1* | 1/2013 | Tan | H02M 7/515 363/40 |
| 2013/0027997 A1* | 1/2013 | Tan | G05F 1/67 363/95 |
| 2013/0234518 A1* | 9/2013 | Mumtaz | H02J 3/40 307/46 |
| 2014/0112041 A1* | 4/2014 | Collin | H02J 3/383 363/123 |
| 2014/0218985 A1* | 8/2014 | Yu | H02M 7/537 363/97 |
| 2015/0002127 A1* | 1/2015 | Huang | G05F 1/67 323/311 |
| 2015/0069840 A1* | 3/2015 | Teo | G05F 1/67 307/52 |
| 2015/0236589 A1* | 8/2015 | Baba | H02M 3/158 307/82 |
| 2015/0270787 A1* | 9/2015 | Fujisaki | H02M 1/08 363/41 |
| 2015/0311800 A1* | 10/2015 | Katayama | H02M 3/158 323/235 |

* cited by examiner

MICRO INVERTER OF SOLAR POWER SYSTEM AND METHOD OF OPERATING THE SAME

BACKGROUND

1. Technical Field

The present disclosure relates generally to a micro inverter of a solar power system and a method of operating the same, and more particularly to a micro inverter with a power boosting function of a solar power system.

2. Description of Related Art

The research and development of alternative energy resources have become the major issue and key polity in many developed countries over the world since the two oil crises of the 1970s. In addition, the oil prices rise because the industrial development promotes the global economic growth and results in the rapid growth of the oil demand. Hence, environmental issues have received more attention recently, and more particularly to the effects of carbon dioxide on air pollution. In order to effectively reduce our dependence on oil as a source of energy, a variety of renewable resources, such as solar energy, wind energy, and so on, are researched and developed.

Because the solar energy has the pollution-free and public harm-free characteristics and is further inexhaustible in supply and always available for use, the solar energy has high potential applications and developments. Recently with the rapidly development of the high-efficiency solar cells, this topic has been gradually promoted by making policies in many developed countries, such as Europe countries, the United States, Japan, and so on.

The conventional common structure of the solar photovoltaic generation system is mainly that the solar photovoltaic module array is in series and/or in parallel. However, the structure of the solar photovoltaic module array has following disadvantages:

It is difficult to consider MPPT function for all in-series or in-parallel solar photovoltaic modules so that the utilization ratio of the solar photovoltaic modules is lower, the influence of the partial shading is serious, and the system expansion is inelastic. In order to overcome the above-mentioned problems, the technology of micro inverters is developed.

Reference is made to FIG. 1 which is a schematic circuit block diagram of a related art solar photovoltaic module and a related art micro inverter. The solar photovoltaic module 10A generates a solar photovoltaic module output power Pv, and the micro inverter 20A generates a micro inverter output power Pm. For convenience, the detailed operation of the relationship between the solar photovoltaic module output power Pv and the micro inverter output power Pm is described hereinafter as follows, and reasonable assumed data are exemplified. It is assumed that the rated output power value of the solar photovoltaic module is 250 watts when the ambient temperature around the solar photovoltaic module is 25° C. If the micro inverter 20A with the 215-watt rated output power value is selected to coordinate with the solar photovoltaic module 10A, the maximum output power of the micro inverter is merely 215 watts even though the solar photovoltaic module output power Pv is 250 watts. In other words, the redundant output power between the output power value of the solar photovoltaic module 10A and the rated output power value of the micro inverter 20A is unavailable so that the utilization ratio of the solar photovoltaic module output power Pv is low. Hence, the better solution to overcome the problem is that the micro inverter 20A with greater rated output power value is selected to coordinate with the solar photovoltaic module 10A so that the micro inverter 20A can completely and fully output the solar photovoltaic module output power Pv, thus increasing the utilization ratio of the solar photovoltaic module output power Pv.

The relationship between the output power value of the solar photovoltaic module 10A and the ambient temperature is negative temperature coefficient. That is, the output power value of the solar photovoltaic module 10A is lower when higher ambient temperature around the solar photovoltaic module 10A. Reference is made to FIG. 2 which is a schematic view of a relationship between the output power value of the solar photovoltaic module and the ambient temperature. Comparing to the above-mentioned example, the solar photovoltaic module output power Pv is 230 watts when the ambient temperature is increased to 40° C.; and also, the solar photovoltaic module output power Pv is 210 watts when the ambient temperature is further increased to 60° C. Therefore, the micro inverter 20A with the 250-watt rated output power value can completely and fully output the solar photovoltaic module output power Pv whether the ambient temperature is 40° C. or 60° C. so that the utilization ratio of the solar photovoltaic module output power Pv is increased.

On the contrary, the solar photovoltaic module output power Pv is 280 watts when the ambient temperature is reduced to 0° C. Because the micro inverter 20A with the 250-watt rated output power value is selected to coordinate with the solar photovoltaic module 10A, the maximum output power of the micro inverter is merely 250 watts even though the solar photovoltaic module output power Pv is 280 watts. In other words, the redundant output power between the output power value of the solar photovoltaic module 10A and the rated output power value of the micro inverter 20A is unavailable so that the utilization ratio of the solar photovoltaic module output power Pv is low.

Accordingly, it is desirable to provide a micro inverter of a solar power system and a method of operating the same to increase output power of the micro inverter without increasing additional solar photovoltaic module devices and merely executing a power boosting function according to the feature of the negative temperature coefficient so as to increase power generation efficiency, reduce power generation costs, increase operation adaptation, and widely apply to different regions and countries.

SUMMARY

An object of the present disclosure is to provide a micro inverter of a solar power system to solve the above-mentioned problems. Accordingly, the solar power system has a solar photovoltaic module producing a solar photovoltaic module output power. The micro inverter includes a DC-to-DC converter, a DC-to-AC converter, a temperature sensor, and a microprocessor. The DC-to-DC converter receives a DC voltage generated from the solar photovoltaic module, and produces a DC output voltage. The DC-to-AC converter receives the DC output voltage, and produces a micro inverter output power. The temperature sensor detects an ambient temperature around the solar photovoltaic module, and produces a temperature detection signal. The microprocessor receives the temperature detection signal and a power boosting signal. The microprocessor correspondingly acquires an output power value of the solar photovoltaic module according to the temperature detection signal when the power boosting signal is enabled, and produces a first control signal to control the DC-to-DC converter and produces a second control signal to control the DC-to-AC converter, thus increasing an output power value of the micro inverter.

Another object of the present disclosure is to provide a micro inverter of a solar power system to solve the above-mentioned problems. Accordingly, the solar power system has a solar photovoltaic module producing a solar photovoltaic module output power. The micro inverter includes a DC-to-DC converter, a DC-to-AC converter, a voltage detector, a current detector, and a microprocessor. The DC-to-DC converter receives a DC voltage generated from the solar photovoltaic module, and produces a DC output voltage. The DC-to-AC converter receives the DC output voltage, and produces a micro inverter output power. The voltage detector detects the DC voltage generated from the solar photovoltaic module, and produces a voltage detection signal. The current detector detects a DC current generated from the solar photovoltaic module, and produces a current detection signal. The microprocessor receives the voltage detection signal, the current detection signal, and a power boosting signal. The microprocessor acquires an output power value of the solar photovoltaic module according to a product of the voltage detection signal and the current detection signal when the power boosting signal is enabled, and produces a first control signal to control the DC-to-DC converter and produces a second control signal to control the DC-to-AC converter, thus increasing an output power value of the micro inverter.

Further another object of the present disclosure is to provide a method of operating a micro inverter of a solar power system. The solar power system has a solar photovoltaic module producing a solar photovoltaic module output power. A micro inverter receives the solar photovoltaic module output power and produces a micro inverter output power. The method comprising following steps: (a) acquiring an output power value of the solar photovoltaic module; (b) judging whether the micro inverter executes a power boosting mode; (c) boosting the maximum output power of the micro inverter from a rated output power value to a maximum output power value when the micro inverter executes the power boosting mode; (d) judging whether the output power value of the solar photovoltaic module is greater than the maximum output power value; and (e) outputting the maximum output power value from the micro inverter when the output power value of the solar photovoltaic module is greater than the maximum output power value.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
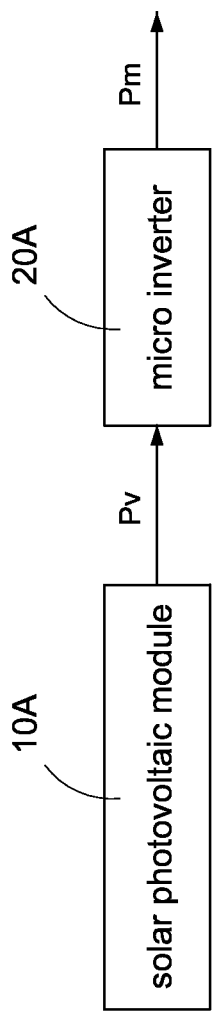
FIG. 1 is a schematic circuit block diagram of a related art solar photovoltaic module and a related art micro inverter.
Figure 2:
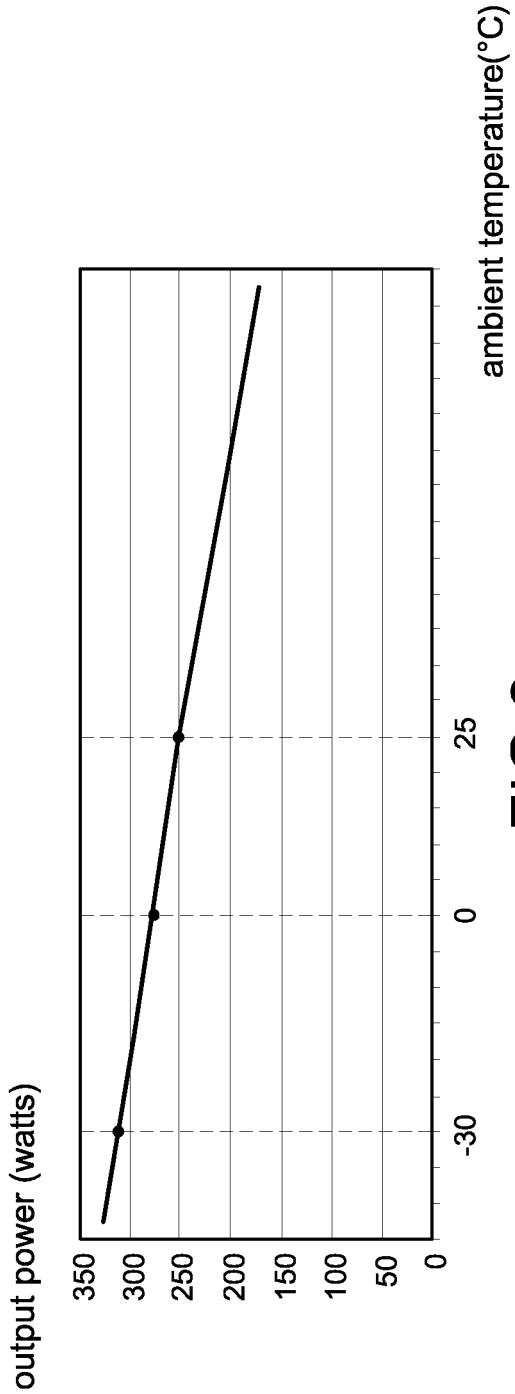
FIG. 2 is a schematic view of a relationship between the output power value of the solar photovoltaic module and the ambient temperature.

Reference will now be made to the drawing figures to describe the present invention in detail.

Figure 3:
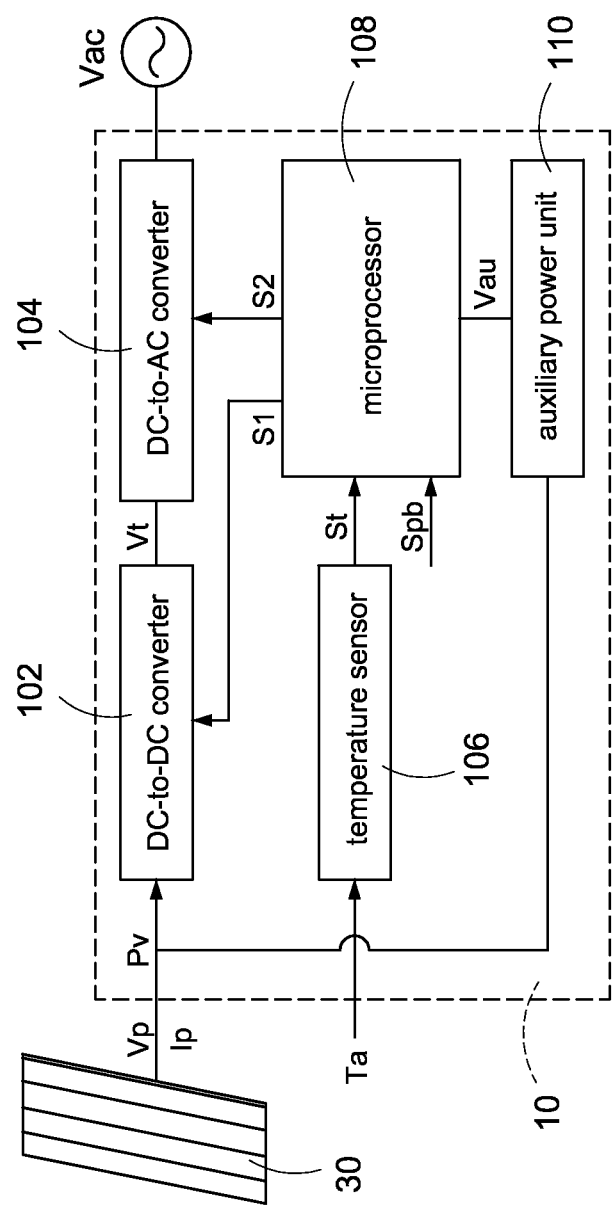
FIG. 3 is a schematic circuit block diagram of a micro inverter of a solar power system according to a first embodiment of the present disclosure.

Reference is made to FIG. 3 which is a schematic circuit block diagram of a micro inverter of a solar power system according to a first embodiment of the present disclosure. The solar power system provides a solar photovoltaic module output power Pv generated from a solar photovoltaic module 30, and the solar photovoltaic module output power Pv is converted into a micro inverter output power Pm by the micro inverter 10. The micro inverter 10 includes a DC-to-DC converter 102, a DC-to-AC converter 104, a temperature sensor 106, and a microprocessor 108. The DC-to-DC converter 102 receives a DC voltage Vp generated from the solar photovoltaic module 30, and converts the DC voltage Vp into a DC output voltage Vt. The DC-to-DC converter 102 is substantially a step-up converter to step up the DC voltage Vp. For a 60-cell solar photovoltaic module, the typical value of the DC voltage Vp is about 30 volts and the typical value of the DC output voltage Vt is about 300 volts. Hence, the DC-to-DC converter 102 is provided to step up the 30-volt DC voltage Vp to the 300-volt DC output voltage Vt. The DC-to-AC converter 104 receives the DC output voltage Vt, and converts the DC output voltage Vt into the micro inverter output power Pm. That is, the DC-to-AC converter 104 receives the DC output voltage Vt, and converts the DC output voltage Vt into an AC power source Vac for supplying power to the rear-end load or electric grid. The temperature sensor 106 detects an ambient temperature Ta around the solar photovoltaic module 30, and produces a temperature detection signal St. The microprocessor 108 receives the temperature detection signal St and a power boosting signal Spb. When the boosting signal Spb is enabled, the microprocessor 108 acquires the solar photovoltaic module output power Pv according to the temperature detection signal St to produce a first control signal S1 and a second control signal S2. The first control signal S1 is provided to control the DC-to-DC converter 102 and the second control signal S2 is provided to control the DC-to-AC converter 104 so as to increase the micro inverter output power Pm. Especially, the power boosting signal Spb is produced inside the micro inverter 10, but not limited. Also, the power boosting signal Spb can be generated by an external mechanism and provided to the micro inverter 10 according to the actual operation requirements for the user. In addition, the micro inverter 10 further includes an auxiliary power unit 110. The auxiliary power unit 110 receives the DC voltage Vp, and converts the DC voltage Vp into at least one DC output voltage, such as 12-volt, 5-volt, or 3.3-volt DC output voltage to be an operation voltage Vau for supplying the microprocessor 108. The detailed operation of power boosting of the micro inverter 10 will be described hereinafter as follows.

Figure 4:
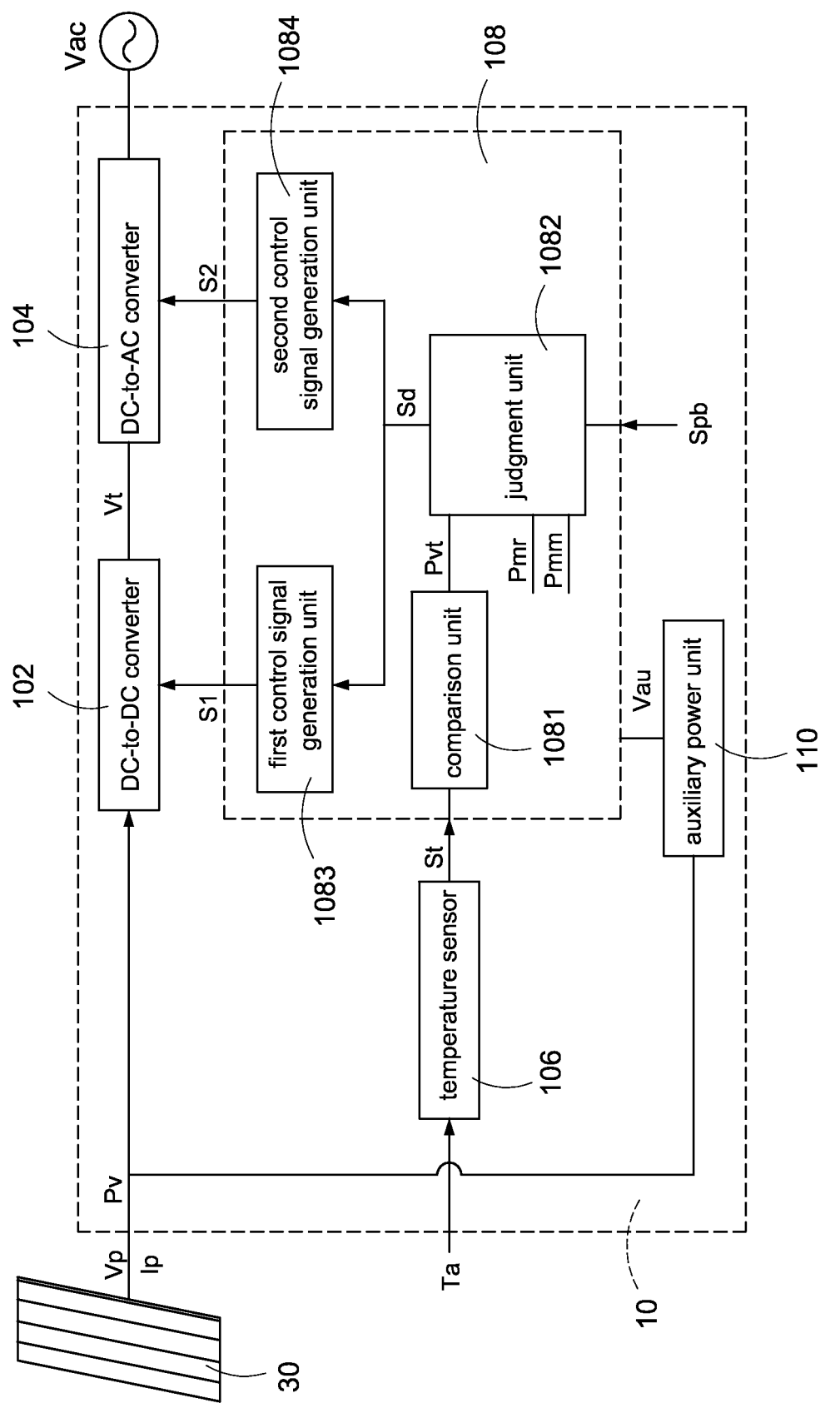
FIG. 4 is a schematic circuit block diagram in detail of the micro inverter of the solar power system according to the first embodiment of the present disclosure.

Reference is made to FIG. 4 which is a schematic circuit block diagram in detail of the micro inverter of the solar power system according to the first embodiment of the present disclosure. The microprocessor 108 has a comparison unit 1081, a judgment unit 1082, a first control signal generation unit 1083, and a second control signal generation unit 1084. The comparison unit 1081 receives the temperature detection signal St, and produces an output power comparison signal Pvt. The judgment unit 1082 receives the output power comparison signal Pvt, the power boosting signal Spb, a rated output power value Pmr, and a maximum output power value Pmm to produce a driving signal Sd. In particular, the rated output power value Pmr and the maximum output power value Pmm are determined according to internal circuit components of the micro inverter 10. In other words, the upper limit value of the output power of the micro inverter 10 is boosted to the maximum output power value Pmm after the micro inverter 10 executes the power boosting mode. Also, the maximum output power value Pmm is determined according to internal circuit components of the micro inverter 10. The first control signal generation unit 1083 receives the driving signal Sd, and produces the first control signal S1 so as to control the DC-to-DC converter 102. The second control signal generation unit 1084 receives the driving signal Sd, and produces the second control signal S2 so as to control the DC-to-AC converter 104. In particular, the first control signal generation unit 1083 and the second control signal generation unit 1084 are a PWM signal generator, respectively; and the first control signal S1 and the second control signal S2 are a PWM signal, respectively.

When the power boosting signal Spb is enabled, the driving signal Sd controls the first control signal generation unit 1083 or the second control signal generation unit 1084 to boost the maximum output power of the micro inverter 10 from the rated output power value Pmr to the maximum output power value Pmm. In particular, the micro inverter 10 outputs the maximum output power value Pmm when the output power value of the solar photovoltaic module 30 is greater than the maximum output power value Pmm. The micro inverter 10 outputs the output power value of the solar photovoltaic module 30 when the output power value of the solar photovoltaic module 30 is less than or equal to the maximum output power value Pmm.

When the power boosting signal Spb is disabled, the maximum output power of the micro inverter 10 is the rated output power value Pmr. In particular, the micro inverter 10 outputs the rated output power value Pmr when the output power value of the solar photovoltaic module 30 is greater than the rated output power value Pmr. The micro inverter 10 outputs the output power value of the solar photovoltaic module 30 when the output power value of the solar photovoltaic module 30 is less than or equal to the rated output power value Pmr. In particular, the user can determine whether the power boosting mode is executed or not, that is, the micro inverter is operated in the normal power mode or the power boosting mode according to the actual requirements. More specifically, one pin of the microprocessor can be used for operating the power boosting mode, that is, the user can control the pin in high level or low level to enable or disable the power boosting mode. Furthermore, the power boosting mode can be controlled by the power boosting signal Spb transmitted through the power line communication (PLC).

Figure 5:
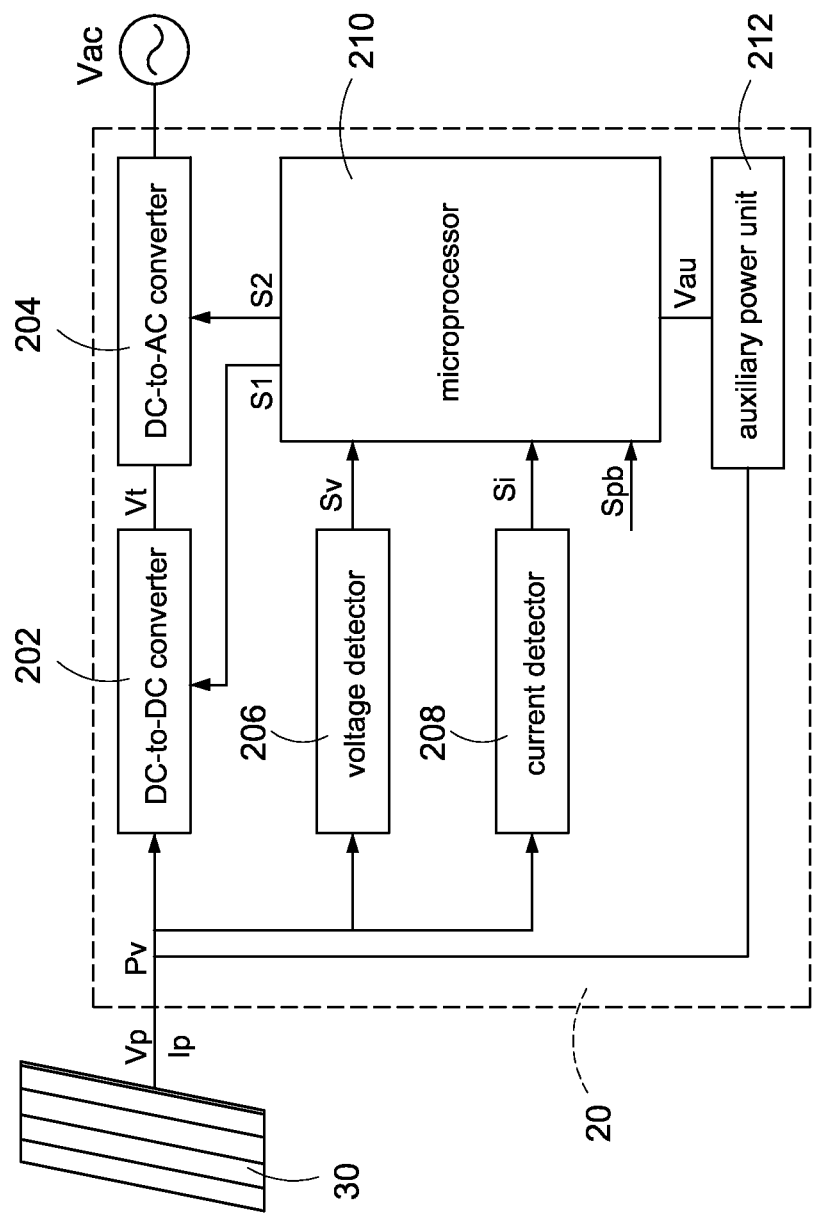
FIG. 5 is a schematic circuit block diagram of the micro inverter of the solar power system according to a second embodiment of the present disclosure.

Reference is made to FIG. 5 which is a schematic circuit block diagram of the micro inverter of the solar power system according to a second embodiment of the present disclosure. The solar power system provides a solar photovoltaic module output power Pv generated from a solar photovoltaic module 30, and the solar photovoltaic module output power Pv is converted into a micro inverter output power Pm by the micro inverter 20. The micro inverter 20 includes a DC-to-DC converter 202, a DC-to-AC converter 204, a voltage detector 206, a current detector 208, and a microprocessor 210. The DC-to-DC converter 202 receives a DC voltage Vp generated from the solar photovoltaic module 30, and converts the DC voltage Vp into a DC output voltage Vt. The DC-to-DC converter 202 is substantially a step-up converter to step up the DC voltage Vp. For a 60-cell solar photovoltaic module, the typical value of the DC voltage Vp is about 30 volts and the typical value of the DC output voltage Vt is about 300 volts. Hence, the DC-to-DC converter 202 is provided to step up the 30-volt DC voltage Vp to the 300-volt DC output voltage Vt. The DC-to-AC converter 204 receives the DC output voltage Vt, and converts the DC output voltage Vt into the micro inverter output power Pm. That is, the DC-to-AC converter 204 receives the DC output voltage Vt, and converts the DC output voltage Vt into an AC power source Vac for supplying power to the rear-end load or electric grid. The voltage detector 206 detects the DC voltage Vp generated from the solar photovoltaic module 30, and produces a voltage detection signal Sv. The current detector 208 detects a DC current Ip generated from the solar photovoltaic module 30, and produces a current detection signal Si. The microprocessor 210 receives the voltage detection signal Sv, the current detection signal Si, and a power boosting signal Spb. When the boosting signal Spb is enabled, the microprocessor 210 acquires an output power value of the solar photovoltaic module according to a product of the voltage detection signal Sv and the current detection signal Si, and produces a first control signal S1 to control the DC-to-DC converter 202 and produces a second control signal S2 to control the DC-to-AC converter 204, thus increasing an output power value of the micro inverter Pm. In addition, the micro inverter 20 further includes an auxiliary power unit 212. The auxiliary power unit 212 receives the DC voltage Vp, and converts the DC voltage Vp into at least one DC output voltage, such as 12-volt, 5-volt, or 3.3-volt DC output voltage to be an operation voltage Vau for supplying the microprocessor 210. The detailed operation of power boosting of the micro inverter 20 will be described hereinafter as follows.

Figure 6:
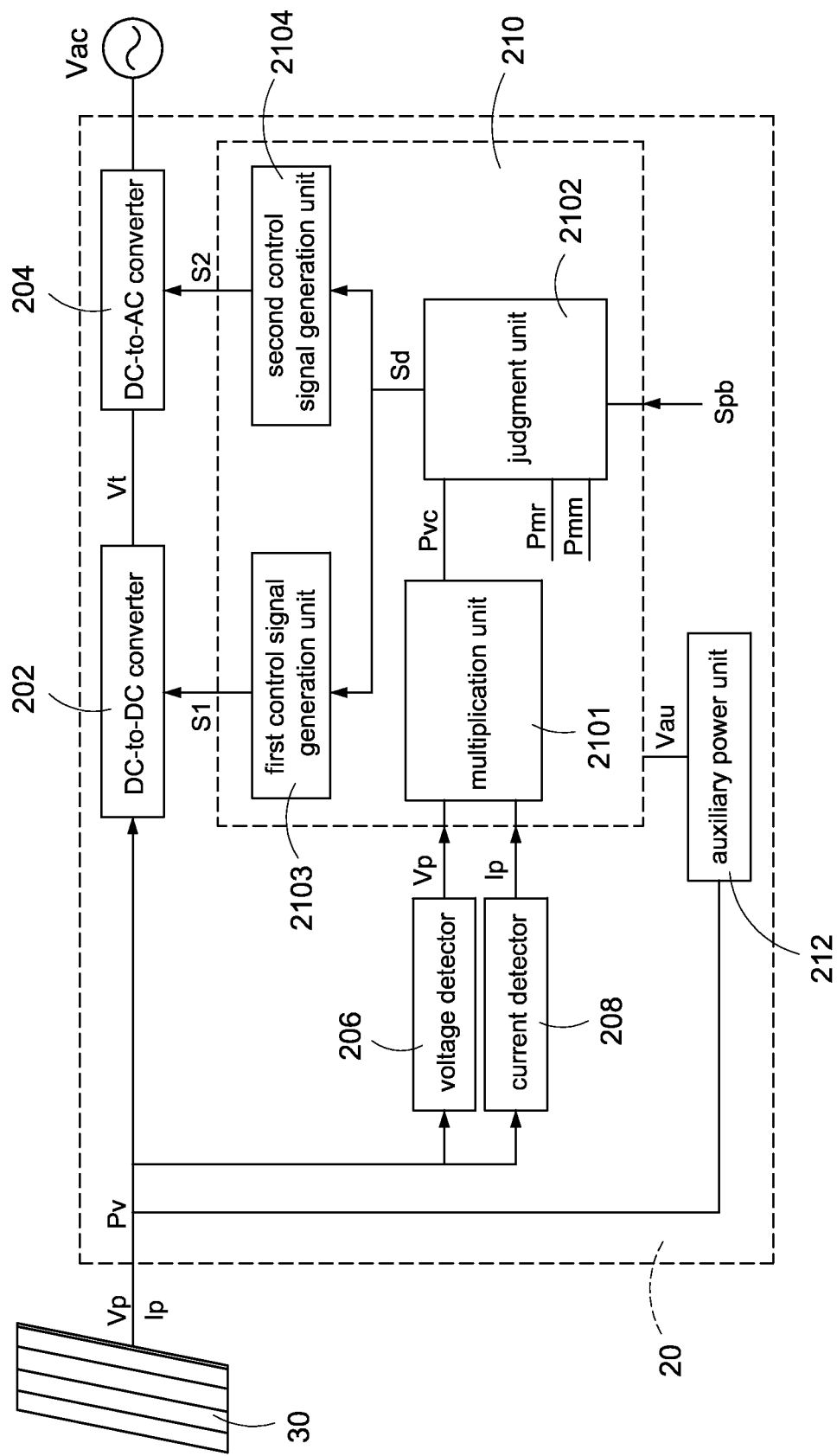
FIG. 6 is a schematic circuit block diagram in detail of the micro inverter of the solar power system according to the second embodiment of the present disclosure.

Reference is made to FIG. 6 which is a schematic circuit block diagram in detail of the micro inverter of the solar power system according to the second embodiment of the present disclosure. The microprocessor 210 has a multiplication unit 2101, a judgment unit 2102, a first control signal generation unit 2103, and a second control signal generation unit 2104. The multiplication unit 2101 receives the voltage detection signal Sv and the current detection signal Si, and calculates the product of the voltage detection signal Sv and the current detection signal Si, thus producing an output power calculation signal Pvc. The judgment unit 2102 receives the output power calculation signal Pvc, the power boosting signal Spb, a rated output power value Pmr, and a maximum output power value Pmm to produce a driving signal Sd. In particular, the rated output power value Pmr and the maximum output power value Pmm are determined according to internal circuit components of the micro inverter 20. In other words, the upper limit value of the output power of the micro inverter 20 is boosted to the maximum output power value Pmm after the micro inverter 20 executes the power boosting mode. Also, the maximum output power value Pmm is determined according to internal circuit components of the micro inverter 20. The first control signal generation unit 2103 receives the driving signal Sd, and produces the first control signal S1 so as to control the DC-to-DC converter 202. The second control signal generation unit 2104 receives the driving signal Sd, and produces the second control signal S2 so as to control the DC-to-AC converter 204. In particular, the first control signal generation unit 2103 and the second control signal generation unit 2104 are a PWM signal generator, respectively; and the first control signal S1 and the second control signal S2 are a PWM signal, respectively.

When the power boosting signal Spb is enabled, the driving signal Sd controls the first control signal generation unit 2103 or the second control signal generation unit 2104 to boost the maximum output power of the micro inverter 20 from the rated output power value Pmr to the maximum output power value Pmm. In particular, the micro inverter 20 outputs the maximum output power value Pmm when the output power value of the solar photovoltaic module 30 is greater than the maximum output power value Pmm. The micro inverter 20 outputs the output power value of the solar photovoltaic module 30 when the output power value of the solar photovoltaic module 30 is less than or equal to the maximum output power value Pmm.

When the power boosting signal Spb is disabled, the maximum output power of the micro inverter 20 is the rated output power value Pmr. In particular, the micro inverter 20 outputs the rated output power value Pmr when the output power value of the solar photovoltaic module 30 is greater than the rated output power value Pmr. The micro inverter 20 outputs the output power value of the solar photovoltaic module 30 when the output power value of the solar photovoltaic module 30 is less than or equal to the rated output power value Pmr. In particular, the user can determine whether the power boosting mode is executed or not, that is, the micro inverter is operated in the normal power mode or the power boosting mode according to the actual requirements. More specifically, one pin of the microprocessor can be used for operating the power boosting mode, that is, the user can control the pin in high level or low level to enable or disable the power boosting mode. Furthermore, the power boosting mode can be controlled by the power boosting signal Spb transmitted through the power line communication (PLC).

Figure 7:
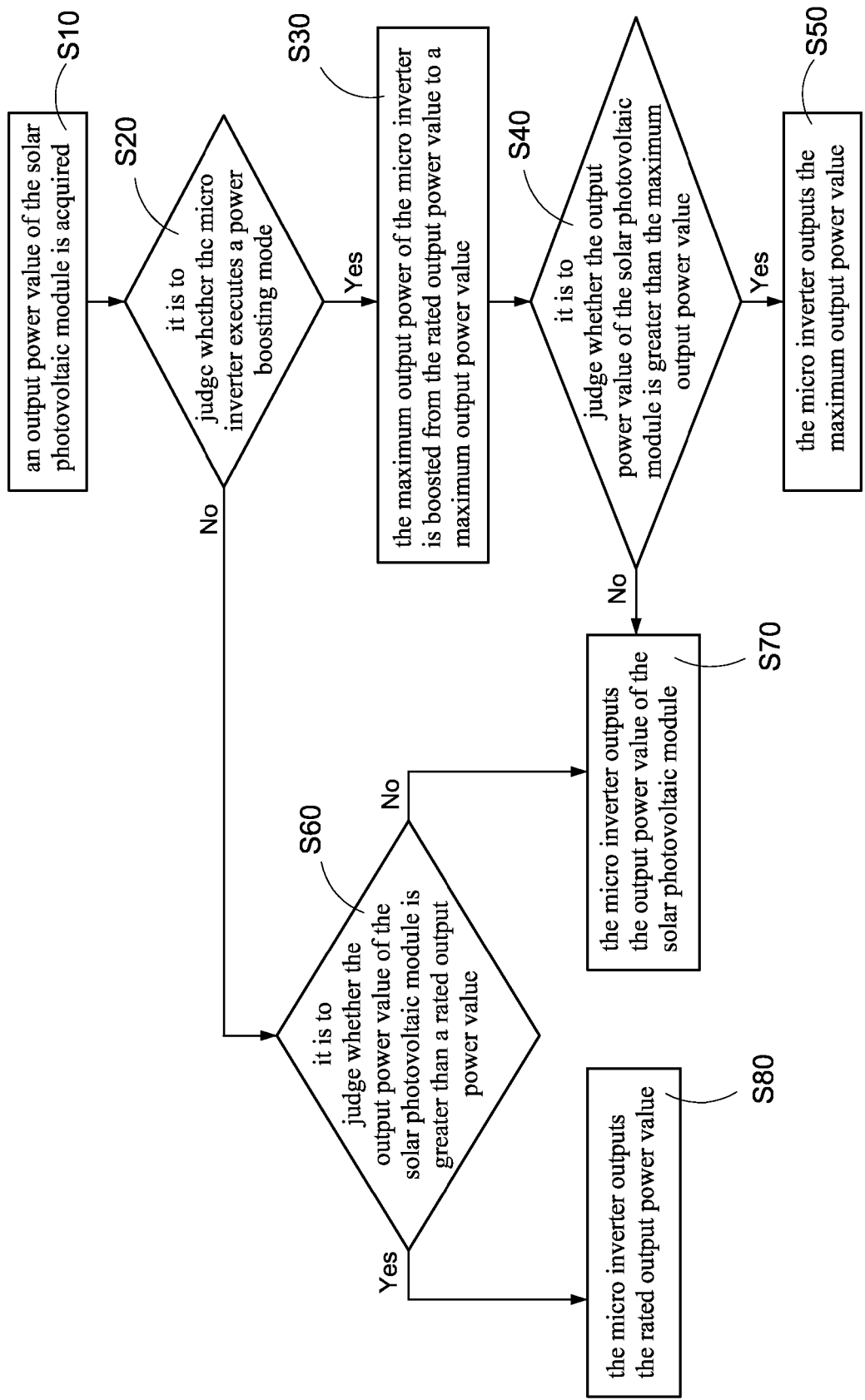
FIG. 7 is a flowchart of a method of operating a micro inverter of a solar power system according to the present disclosure.

Reference is made to FIG. 7 which is a flowchart of a method of operating a micro inverter of a solar power system according to the present disclosure. The solar power system has a solar photovoltaic module producing a solar photovoltaic module output power. A micro inverter receives the solar photovoltaic module output power and produces a micro inverter output power. The method of operating the micro inverter has following steps. First, an output power value of the solar photovoltaic module is acquired (S10). In particular, data of relationship between output power values of the solar photovoltaic module and ambient temperatures around the solar photovoltaic module are record in a lookup table, and the output power value of the solar photovoltaic module corresponding to the ambient temperature is acquired based on the recorded data in the lookup table. Also, the ambient temperature around the solar photovoltaic module is detected by a temperature sensor. In addition, the output power value of the solar photovoltaic module is acquired by calculating a product of the DC voltage and the DC current generated from the solar photovoltaic module. Also, the DC voltage and the DC current are detected by a voltage detector and a current detector, respectively. Afterward, it is to judge whether the micro inverter executes a power boosting mode (also called an energy boosting mode) (S20). In particular, the user can determine whether the power boosting mode is executed or not, that is, the micro inverter is operated in the normal power mode or the power boosting mode according to the actual requirements. The detailed operation of normal power mode or the power boosting mode of the micro inverter will be described hereinafter as follows. After the step (S20), if the power boosting mode is not executed, it is to judge whether the output power value of the solar photovoltaic module is greater than a rated output power value (S60). In particular, the rated output power value is the active power outputted from the micro inverter for a long time under the stable operation. On the contrary, after the step (S20), if the power boosting mode is executed, the maximum output power of the micro inverter is boosted from the rated output power value to a maximum output power value (S30). Especially, the maximum output power of the micro inverter is the rated output power value when the micro inverter is operated in the normal power mode; the maximum output power of the micro inverter is the maximum output power value when the micro inverter is operated in the power boosting mode.

After the step (S30), it is to judge whether the output power value of the solar photovoltaic module is greater than the maximum output power value (S40). If the output power value of the solar photovoltaic module is greater than the maximum output power value, the micro inverter outputs the maximum output power value (S50). On the contrary, the micro inverter outputs the output power value of the solar photovoltaic module if the output power value of the solar photovoltaic module is less than or equal to the maximum output power value (S70). After the step (S60), if the output power value of the solar photovoltaic module is less than or equal to the rated output power value, the step (S70) is executed. On the contrary, if the output power value of the solar photovoltaic module is greater than the rated output power value, the micro inverter outputs the rated output power value (S80).

For convenience, the detailed operation of the micro inverter of the solar power system is described hereinafter as follows, and reasonable assumed data are exemplified. It is assumed that the output power value of the solar photovoltaic module is 250 watts when the ambient temperature around the solar photovoltaic module is 25° C. Because of the relationship between the output power value of the solar photovoltaic module and the ambient temperature is negative temperature coefficient, it is assumed that the output power value of the solar photovoltaic module is 280 watts when the ambient temperature around the solar photovoltaic module is 0° C., and the output power value of the solar photovoltaic module is 320 watts when the ambient temperature around the solar photovoltaic module is −30° C. In addition, it is assumed that the rated output power value of the micro inverter is 250 watts; also the maximum output power of the micro inverter is boosted from the 250 watts (the rated output power value) to 300 watts (the maximum output power value) when the power boosting mode is executed.

Based on the above-mentioned reasonable assumed data, three different output power values of the solar photovoltaic module are exemplified but are not intended to limit the scope of the disclosure.

(1) It is assumed that the output power value of the solar photovoltaic module is 230 watts. Correspondingly, the ambient temperature around the solar photovoltaic module is about 45° C. According to the relationship between the output power value and the ambient temperature, which can be recorded in a lookup table, the output power value of the solar photovoltaic module can be estimated to be 230 watts. In addition, the output power value of the solar photovoltaic module can also calculated by the DC voltage and the DC current generated from the solar photovoltaic module. Because the output power value (230 watts) of the solar photovoltaic module is less than or equal to the rated output power value (250 watts), the micro inverter outputs the output power value of the solar photovoltaic module (230) whether the power boosting mode is executed or not.

(2) It is assumed that the output power value of the solar photovoltaic module is 280 watts. Correspondingly, the ambient temperature around the solar photovoltaic module is about 0° C. According to the relationship between the output power value and the ambient temperature, which can be recorded in a lookup table, the output power value of the solar photovoltaic module can be estimated to be 280 watts. In addition, the output power value of the solar photovoltaic module can also calculated by the DC voltage and the DC current generated from the solar photovoltaic module. Because the output power value (280 watts) of the solar photovoltaic module is greater than the rated output power value (250 watts), the micro inverter outputs the rated output power value (250) if the power boosting mode is not executed. On the contrary, the maximum output power of the micro inverter is boosted from the 250 watts (the rated output power value) to 300 watts (the maximum output power value) if the power boosting mode is executed. However, the micro inverter outputs the output power value (280 watts) of the solar photovoltaic module because the output power value (280 watts) of the solar photovoltaic module is less than or equal to the maximum output power value (300 watts). That is, the output power value of the solar photovoltaic module can be completely and fully outputted through the micro inverter because the power boosting mode is executed.

(3) It is assumed that the output power value of the solar photovoltaic module is 320 watts. Correspondingly, the ambient temperature around the solar photovoltaic module is about −30° C. According to the relationship between the output power value and the ambient temperature, which can be recorded in a lookup table, the output power value of the solar photovoltaic module can be estimated to be 320 watts. In addition, the output power value of the solar photovoltaic module can also calculated by the DC voltage and the DC current generated from the solar photovoltaic module. Because the output power value (320 watts) of the solar photovoltaic module is greater than the rated output power value (250 watts), the micro inverter outputs the rated output power value (250) if the power boosting mode is not executed. On the contrary, the maximum output power of the micro inverter is boosted from the 250 watts (the rated output power value) to 300 watts (the maximum output power value) if the power boosting mode is executed. However, the micro inverter outputs the maximum output power value (300 watts) because the output power value (320 watts) of the solar photovoltaic module is greater than the maximum output power value (300 watts). That is, the output power value of the solar photovoltaic module can be boosted from the rated output power value to the maximum output power value because the power boosting mode is executed.

In conclusion, the present disclosure has following advantages:

1. Because of the relationship between the output power value of the solar photovoltaic module and the ambient temperature is negative temperature coefficient, the power boosting mode can be implemented so that the solar photovoltaic module can output more power under the low-temperature environment;

2. One pin of the microprocessor can be used for operating the power boosting mode, that is, the user can control the pin in high level or low level to enable or disable the power boosting mode. If the power boosting mode is not executed, the micro inverter is operated in the normal power mode; if the power boosting mode is executed, the maximum output power of the micro inverter is boosted from the rated output power value to a maximum output power value;

3. The micro inverter can output more power without increasing additional solar photovoltaic module devices when the power boosting mode is executed, thus increasing utilization ratio and improving power generation efficiency under the same power generation costs;

4. Because the power boosting mode is implemented, the micro inverter with the smaller or appropriate rated output power can be used to coordinate the solar photovoltaic module. The output power of the micro inverter can be boosted by executing the power boosting mode, thus recusing equipment costs and increasing operation adaptation; and 5. The solar photovoltaic module coordinated with the micro inverter with the power-boosting function can be widely applied to different regions and countries, and more particularly to extremely cold regions and countries so as to significantly increase the value of the power boosting function.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A micro inverter of a solar power system, the solar power system having a solar photovoltaic module producing a solar photovoltaic module output power, the micro inverter comprising: a DC-to-DC converter configured to receive a DC voltage generated from the solar photovoltaic module, and produce a DC output voltage; a DC-to-AC converter configured to receive the DC output voltage, and produce a micro inverter output power; a temperature sensor configured to detect an ambient temperature around the solar photovoltaic module, and produce a temperature detection signal; and a microprocessor configured to receive the temperature detection signal and a power boosting signal; wherein the microprocessor is configured to correspondingly acquire an output power value of the solar photovoltaic module according to the temperature detection signal when the power boosting signal is enabled, and produce a first control signal to control the DC-to-DC converter and produce a second control signal to control the DC-to-AC converter, thus increasing an output power value of the micro inverter; the microprocessor comprising: a comparison unit configured to receive the temperature detection signal, and produce an output power comparison signal; a judgment unit configured to receive the output power comparison signal, the power boosting signal, and the output power value of the micro inverter to produce a driving signal; a first control signal generation unit configured to receive the driving signal, and produce the first control signal; and a second control signal generation unit configured to receive the driving signal, and produce the second control signal; wherein the driving signal is configured to control the first control signal generation unit or the second control signal generation unit to boost the maximum output power of the micro inverter from a rated output power value to a maximum output power value when the power boosting signal is enabled; when the output power value of the solar photovoltaic module is greater than the maximum output power value, the micro inverter is configured to output the maximum output power value; or when the output power value of the solar photovoltaic module is less than or equal to the maximum output power value, the micro inverter is configured to output the output power value of the solar photovoltaic module.

2. The micro inverter of the solar power system in claim 1, wherein the maximum output power of the micro inverter is a rated output power value when the power boosting signal is disabled; when the output power value of the solar photovoltaic module is greater than the rated output power value, the micro inverter is configured to output the rated output power value; when the output power value of the solar photovoltaic module is less than or equal to the rated output power value, the micro inverter is configured to output the output power value of the solar photovoltaic module.

3. The micro inverter of the solar power system in claim 1, wherein the comparison unit is a lookup table, and the comparison unit is configured to record data of relationship between output power values of the solar photovoltaic module and ambient temperatures around the solar photovoltaic module; the ambient temperature is correspondingly detected according to the temperature detection signal, and the output power value of the solar photovoltaic module corresponding to the ambient temperature is acquired based on the recorded data in the lookup table.

4. The micro inverter of the solar power system in claim 1, wherein the rated output power value and the maximum output power value are determined according to internal circuit components of the micro inverter.

5. The micro inverter of the solar power system in claim 1, wherein the micro inverter further comprises:
   an auxiliary power unit configured to receive the DC voltage, and convert the DC voltage to produce at least one operation voltage for the microprocessor.

6. A micro inverter of a solar power system, the solar power system having a solar photovoltaic module producing a solar photovoltaic module output power, the micro inverter comprising: a DC-to-DC converter configured to receive a DC voltage generated from the solar photovoltaic module, and produce a DC output voltage; a DC-to-AC converter configured to receive the DC output voltage, and produce a micro inverter output power; a voltage detector configured to detect the DC voltage generated from the solar photovoltaic module, and produce a voltage detection signal; a current detector configured to detect a DC current generated from the solar photovoltaic module, and produce a current detection signal; and a microprocessor configured to receive the voltage detection signal, the current detection signal, and a power boosting signal; wherein the microprocessor is configured to acquire an output power value of the solar photovoltaic module according to a product of the voltage detection signal and the current detection signal when the power boosting signal is enabled, and produce a first control signal to control the DC-to-DC converter and produce a second control signal to control the DC-to-AC converter, thus increasing an output power value of the micro inverter; the microprocessor comprising: a multiplication unit configured to receive the voltage detection signal and the current detection signal, and calculate the product of the voltage detection signal and the current detection signal, thus producing an output power calculation signal; a judgment unit configured to receive the output power calculation signal, the power boosting signal, and the output power value of the micro inverter to produce a driving signal; a first control signal generation unit configured to receive the driving signal, and produce the first control signal; and a second control signal generation unit configured to receive the driving signal, and produce the second control signal; wherein the driving signal is configured to control the first control signal generation unit or the second control signal generation unit to boost the maximum output power of the micro inverter from a rated output power value to a maximum output power value when the power boosting signal is enabled; when the output power value of the solar photovoltaic module is greater than the maximum output power value, the micro inverter is configured to output the maximum output power value; or when the output power value of the solar photovoltaic module is less than or equal to the maximum output power value, the micro inverter is configured to output the output power value of the solar photovoltaic module.

7. The micro inverter of the solar power system in claim 6, wherein the maximum output power of the micro inverter is a rated output power value when the power boosting signal is disabled; when the output power value of the solar photovoltaic module is greater than the rated output power value, the micro inverter is configured to output the rated output power value; when the output power value of the solar photovoltaic module is less than or equal to the rated output power value, the micro inverter is configured to output the output power value of the solar photovoltaic module.

8. The micro inverter of the solar power system in claim 6, wherein the rated output power value and the maximum output power value are determined according to internal circuit components of the micro inverter.

9. The micro inverter of the solar power system in claim 6, wherein the micro inverter further comprises:
   an auxiliary power unit configured to receive the DC voltage, and convert the DC voltage to produce at least one operation voltage for the microprocessor.

10. A method of operating a micro inverter of a solar power system, the solar power system having a solar photovoltaic module producing a solar photovoltaic module output power; a micro inverter configured to receive the solar photovoltaic module output power and produce a micro inverter output power, the method comprising the following steps: (a) acquiring an output power value of the solar photovoltaic module; (b) judging whether the micro inverter executes a power boosting mode; (c)(i) boosting the maximum output power of the micro inverter from a rated output power value to a maximum output power value when the micro inverter executes the power boosting mode; or (c)(ii) if the micro inverter does not execute the power boosting mode, judging whether the output power value of the solar photovoltaic module is greater than the rated output power value, and either: outputting the output power value of the solar photovoltaic module from the micro inverter when the output power value of the solar photovoltaic module is less than or equal to the rated output power value, or outputting the rated output power value from the micro inverter when the output power value of the solar photovoltaic module is greater than the rated output power value; (d) judging whether the output power value of the solar photovoltaic module is greater than the maximum output power value; and (e) outputting the maximum output power value from the micro inverter when the output power value of the solar photovoltaic module is greater than the maximum output power value.

11. The method of operating the micro inverter of the solar power system in claim 10, wherein after the step (d), the method comprises following step:
   outputting the output power value of the solar photovoltaic module from the micro inverter when the output power value of the solar photovoltaic module is less than or equal to the maximum output power value.

12. The method of operating the micro inverter of the solar power system in claim 10, wherein in the step (a), data of relationship between output power values of the solar photovoltaic module and ambient temperatures around the solar photovoltaic module are record in a lookup table, and the output power value of the solar photovoltaic module corresponding to the ambient temperature is acquired based on the recorded data in the lookup table.

13. The method of operating the micro inverter of the solar power system in claim 12, wherein the ambient temperature around the solar photovoltaic module is detected by a temperature sensor.

14. The method of operating the micro inverter of the solar power system in claim 10, wherein in the step (a), the output power value of the solar photovoltaic module is acquired by calculating a product of the DC voltage and the DC current generated from the solar photovoltaic module.

\* \* \* \* \*